United States Patent [19]

Hama

[11] 4,417,28
[45] Nov. 22, 198

[54] IMAGE MAGNIFICATION CONTROL MECHANISM FOR FACSIMILE ZOOM LENS

[75] Inventor: Yoshihiro Hama, Tokyo, Japan

[73] Assignee: Asahi Kogaku Kogyo Kabushiki Kaisha, Tokyo, Japan

[21] Appl. No.: 322,840

[22] Filed: Nov. 19, 1981

[30] Foreign Application Priority Data

Nov. 21, 1980 [JP] Japan .............................. 55-167176

[51] Int. Cl.³ .............................................. H04N 1/04
[52] U.S. Cl. .................................. 358/287; 350/429; 358/210; 358/225
[58] Field of Search .............. 358/287, 139, 210, 225; 350/423, 429

[56] References Cited

U.S. PATENT DOCUMENTS

| | | | |
|---|---|---|---|
| 3,435,136 | 3/1969 | Bachmann | 358/139 |
| 4,161,756 | 7/1979 | Thomas | 358/225 |
| 4,345,276 | 8/1982 | Colomb | 358/287 |

*Primary Examiner*—Howard Britton
*Attorney, Agent, or Firm*—Sughrue, Mion, Zinn, Macpeak and Seas

[57] ABSTRACT

An image magnification control mechanism for a fa simile zoom lens is provided in which a position detec ing section is directly coupled to a drive member fc moving the optical system of the zoom lens. The pos tions of the lens groups are controlled by a servo mecl anism controlled by a pulse signal from the detectin section which also controls the speed of the zoom len An address instruction detecting section is used 1 achieve the positioning operation quickly and acci rately. In the preferred embodiment, the invention comprised of a stationary detection slit and a rotai member having only a finite number of slits correspon( ing to different magnification ratios. Speed control sli are provided on either side of either the stationary c movable slits to provide signals for stepwise increasin or decreasing the zooming speed. Address slits an corresponding detectors are provided for determinin which of the magnification ratios is presently bein used.

11 Claims, 9 Drawing Figures

IMAGE MAGNIFICATION CONTROL MECHANISM FOR FACSIMILE ZOOM LENS

BACKGROUND OF THE INVENTION

This invention relates to an image magnification control mechanism for a facsimile zoom lens.

A variety of methods have been provided for permitting picture size to be varied without increasing or decreasing the image characteristics, such as, e.g., resolution, in variable image magnification line scanning system facsimile apparatus of the type wherein optical data from different sized originals are converted into video signals by a line sensor, which video signals are then supplied to a transmission circuit. In one method wherein the magnification is varied with one fixed-focus lens, the distance between an object and its image is variable. Therefore, if the object side is fixed, then the photographing lens and the line sensor must be moved a substantial distance in order to properly form the image. Accordingly, the mechanism is necessarily intricate and is not practical.

An alternative method is one in which the focal length of a photographing lens is varied, so that magnification variation is carried out without changing the distance between an object and its image. Examples of this method are a turret system using a plurality of lenses in a switching mode and a zoom system. In the turret system, a plurality of fixed-focus lenses are selectively used by turning a lens holding plate. Therefore, if the distance between an object and its image is maintained unchanged for all of the lenses, it is difficult to provide a desired magnification. In the zoom system, one zoom lens is used to continuously change the focal length without changing the distance between an object and its image, thereby changing the picture size. Therefore, if the zooming position can be controlled accurately, then a desired magnification can be readily obtained.

This invention is intended to provide a mechanism for controlling a facsimile zoom lens to achieve image magnification variation for a line scanning system facsimile in which a zoom lens is used to change the image magnification.

The optical system of a facsimile zoom lens is made up of at least two groups of lenses having negative and positive powers, so that the image magnification can be varied without changing the distance between an object and its image. In general, the drive member of a zoom lens barrel for moving the above-described optical system comprises: a drive ring rotatable around the optical axis and having cam grooves defining a zoom region in the outer wall; an outer cylinder which is slidably fitted in the drive ring and in which lens group moving rings are slidably fitted, the outer cylinder having straight grooves or cam grooves to control the movements, in the direction of rotation, of the lens group moving rings; and lens moving rings in which roller pins are embedded, the roller pins sliding while engaging with the cam grooves and the straight grooves or the cam grooves in the outer cylinder.

The zooming is achieved as follows: As the drive ring is turned, the lens group moving rings are turned through the engagement of the roller pins with the straight grooves or the cam grooves of the outer cylinder, while the lens group moving rings are moved back and forth through the engagement of the roller pins with the cam grooves of the drive ring, so that the lens groups are displaced. Therefore, the image magnification of the zoom lens can be controlled by a method in which a position detector is provided for each lens group to control the position thereof. However, this method is not practical in that, if a plurality of lens groups are employed, then the positions of these plural lens groups must be controlled simultaneously and accordingly the construction is necessarily intricate. On the other hand, because of the facsimile's function, an image magnification must be quickly and accurately changed when a picture size is changed.

SUMMARY OF THE INVENTION

According to the present invention, an image magnification control mechanism for a facsimile zoom lens is provided in which a position detecting section is provided directly for a drive member adapted to move the optical system of the zoom lens. This will prevent the occurrence of positioning errors due to slack in the transmission system between a control section and the drive member. The positions of the lens groups are controlled by a servo mechanism controlled by a pulse signal from the detecting section, and the invention also provides a detecting section capable of controlling the speed and an address instruction detecting section so as to achieve the positioning operation quickly and accurately.

In its preferred embodiment, the invention comprises a stationary detection slit and a rotary member having a plurality of slits corresponding to different magnification ratios. Speed control slits are provided on either side of either the stationary or movable slits to provide signals for stepwise increasing or decreasing the zooming speed. One or more address slits and corresponding detectors are provided for determining which of the magnification ratios is presently used. The slits may be replaced with other indication mechanisms, e.g. reflective members or magnetic members, if desired.

BRIEF DESCRIPTION OF THE DRAWINGS

This invention will now be described with reference to its preferred embodiments as shown in the accompanying drawings, in which.

DETAILED DESCRIPTION OF THE INVENTION

The embodiments of this invention are described with reference to a so-called "two-lens-group type zoom lens" which is the simplest in construction among the zoom lenses and has only two groups of movable lenses.

However, the technical concept of the invention can be applicable to a zoom lens having more than two groups of movable lenses.

Figure 1:
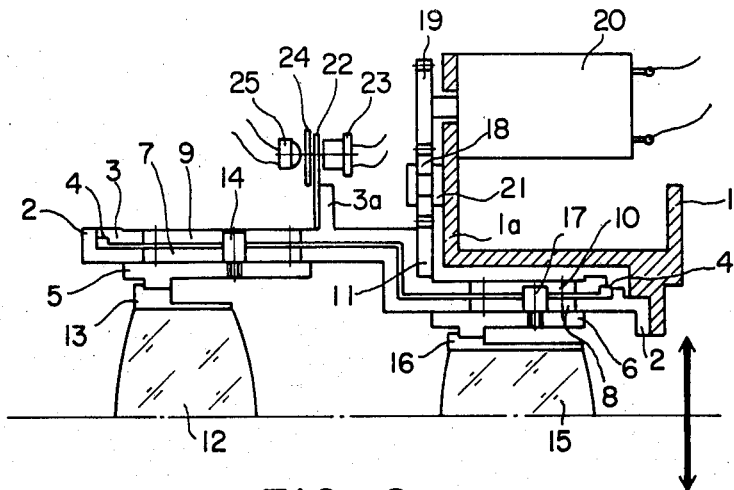
FIG. 1 is a sectional side view of a zoom lens section a detection section and a drive section.

FIG. 1 is a sectional side view showing a zoom lens section, a detection section and a drive section. A lens barrel body 1 secured to a facsimile body (not shown) holds an outer cylinder 2. A gear shaft 21 is embedded in the flange 1a of the lens barrel body 1 in such a manner that it is in parallel with the optical axis. The outer cylinder 2 is held by the lens barrel body 1 at one end and is rotatably fitted in a drive ring 3 through bearing balls 4 so as to prevent movement of the drive ring 3 in the optical axis direction. The outer cylinder 2 consists of a large diameter portion and a small diameter portion with a step therebetween. A front lens group moving ring 5 is slidably fitted in the inner wall of the larger diameter portion, while a rear lens group moving ring 6 is slidably fitted in the inner wall of the small diameter portion. Two diametrically opposite front lens group straight grooves 7 are cut in the large diameter portion of the outer cylinder 2, while two diametrically opposite rear lens group straight grooves 8 are cut in the small diameter portion, the straight grooves extending in the optical axis direction. The drive ring 3 is rotatably engaged with the outer cylinder 2, and has a front lens group moving cam groove 9 and a rear lens group moving cam groove 10. The drive ring 3 has a step, or a shoulder, on which a drive gear 11 is mounted.

The front lens group moving ring is slidably fitted in the outer cylinder 2 and holds a front frame 13 holding a front lens group 12. Roller shafts 14 are embedded diametrically oppositely in the outer wall of the front lens group moving ring 5. The roller shafts 14 are slidably engaged with the front lens group straight grooves 7 and the front lens group moving cam groove 9, at two positions, the other position being in the lower portion of the assembly not shown in FIG. 1. On the other hand, the rear lens group moving ring 6 is slidably fitted in the outer cylinder 2 and holds a rear frame 16 holding a rear lens group 15. Roller shafts 17 are embedded diametrically opposite in the outer wall of the rear lens group moving ring 6. The roller shafts 17 are slidably engaged with the rear lens group straight grooves 8 and the rear lens group moving cam groove 10, at two positions. A drive pinion 18 is rotatably mounted on the gear shaft 21 in such a manner that its movement in a thrust direction, i.e. in a direction parallel to the optical axis, is limited and it is engaged with the drive gear 11 on the drive ring 3. This configuration is substantially the same as that described in copending application Ser. No. 315,562, filed on Oct. 27, 1981.

A motor pinion 19 mounted on the drive shaft of a drive motor 20 is engaged with the drive pinion 18 so as to transmit the rotation of the drive motor 20 to the zoom lens. An annular position detecting rotary slit board 22 is mounted on the flange 3a of the drive ring 3 in such a manner that it can rotate around the optical axis together with the drive ring 3. Positioning slits 26, speed control slits 27 and an address specifying slit 28 are cut in the side of the rotary slit board 22.

Figure 2:
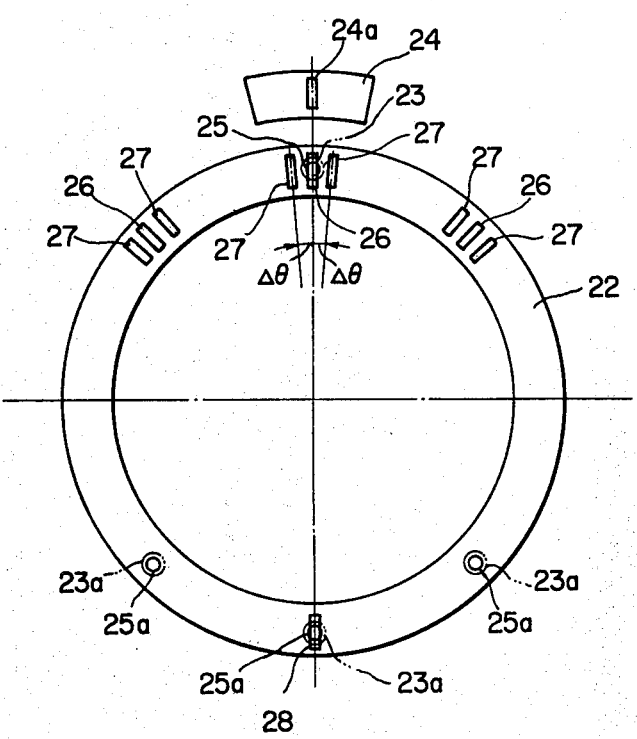
FIG. 2 is a plan view of a position detecting rotary slit board and a stationary slit plate.

The number of positioning slits 26 is equal to the number of different picture sizes which can be transmitted as shown in FIG. 2 (the number being three (3) in FIG. 2). The positioning slits 26 are so arranged that, when the zoom lens system is moved to a position corresponding to the image magnification of a selected picture size as the result of a predetermined angle rotation of the drive ring 3, the corresponding positioning slit 26 is at a predetermined position (at the top of the ring 22 in FIG. 2) and aligns with a slit 24a of a stationary slit plate 24 (described later). The positioning slits 26 are used for servo drive positioning.

The speed control slits 27 are provided symmetrically on both sides on a respective positioning slit 26 in such a manner that they are spaced by an angle required for acceleration and deceleration from the positioning slit 26. The number of speed control slits 27 is equal to the number of speed control steps so that the motor can be slowed down gradually as it approaches a desired position. However, for the positioning slits 26 provided for maximum and minimum picture sizes, the speed control slits 26 need only be provided on one side, hereinafter referred to as "the operating side", since these slits should not pass entirely by the slit 24a.

In FIG. 2, the stationary slit plate 24 is right above the position detecting rotary slit board 22. The slit 24a is cut in the stationary slit plate 24. As the zoom lens system approaches a position corresponding to the desired image magnification of a picture size by rotation of the drive ring 3, the slit 24a first aligns with the speed control slit 27 which is on one side of the desired positioning slit 26, and then aligns with the positioning slit 26 when the zoom lens system reaches the aforementioned position. It should be noted that only one speed control slit is shown on each side of the positioning slits 26 in FIG. 2, so that two speeds are available, i.e. a slow speed between each positioning slit and either of its respective speed control slits, and a faster speed from one speed control slit to another. If more speed control slits were provided, the speed could be varied in more than two steps.

A light emitting device 23 confronts a light receiving device 25 through the position detecting rotary slit board 22 and the stationary slit plate 24 as shown in FIGS. 1 and 2. When the slit 24a of the stationary slit plate 24 aligns with any one of the positioning slits 26 or any one of the speed control slits 27 formed in the position detecting rotary slit board 22, light from the light emitting device 23 is applied through these slits to the light receiving device 25, as a result of which the latter 25 outputs a pulse signal for speed control for positioning control to a control system (described later).

Figure 3:
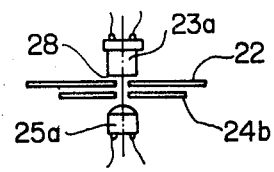
FIG. 3 is a sectional view showing the essential components of the position detecting rotary slit board and the stationary slit plate, which are provided at a position where a light receiving device and a light emitting device are arranged.

At positions along the position detecting rotary slit board 22, which are located diametrically opposite the positioning slit 26, i.e. on a prolongation extended from each positioning slit 26 through the optical axis when the board 22 is in its center position shown in FIG. 2, a light emitting device 23a for address detection confronts a light receiving device 25a through the rotary slit board 22 and a stationary slit plate 24b for address detection as shown in FIG. 3 (the devices 23a and 25a in FIG. 3 being provided at three positions as shown in FIG. 2). An address specifying slit 28 is provided at the position on the rotary slit board 22 which is located on a prolongation extended from the center positioning slit through the optical axis.

When any one of the positioning slits 26 aligns with the slit 24a of the stationary slit plate 24, the address specifying slit 28 aligns with the slit of the particular stationary slit plate 24b corresponding to the correct position of the aforementioned positioning slit so as to allow light from the light emitting device 23a for address detection to reach the light receiving device 25a for address detection. Therefore, the address of the picture size can be determined by detecting which of the light receiving devices 25a has outputted a signal.

Figure 5:
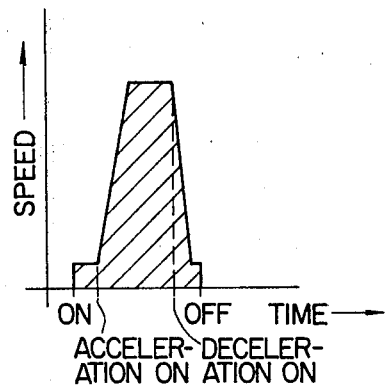
FIGS. 5 and 6 are graphical representations indicating speed vs. time.
Figure 6:
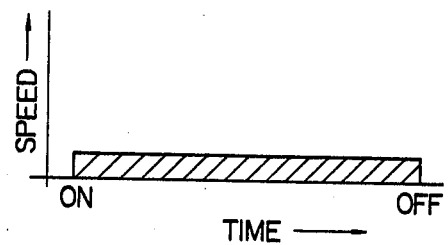

A control system for the above-described arrangement will be described with reference to a block diagram shown in FIG. 4. When the system is at rest, a positioning slit 26 is always aligned with the slit 24a of the stationary slit plate 24. Therefore, the address specifying slit 28 is always aligned with the slit of an address detecting stationary slit plate 24b corresponding to the positioning of the slit 26, and one of the address detecting light receiving devices 25a outputs a signal. In the address detecting operation, the signal thus outputted is compared with a picture size conversion signal from the facsimile body indicating the desired magnification ratio. If the picture size signal is equal to the present picture size signal indicated by the output of one of the address detection receiving devices 25a, then no instruction signal is applied to either the drive motor control circuit or speed control circuit. If it is different, then an instruction signal is applied to the drive motor control circuit and to the speed control circuit. As a result, the drive motor control circuit controls the direction of rotation and the initial drive speed of the drive motor 20 so that the image magnification is changed to correspond to the present picture size signal. The drive motor 20 thus controlled operates to turn the drive ring 3. As a result, the positioning slit 26 is displaced from the slit 24a of the stationary slit plate 24, and the light is intercepted. However, when the drive ring 3 is turned through a predetermined angle $\Delta\theta$, the slit 24a of the stationary slit plate 24 aligns with the speed control slit 27, so that light from the light emitting device 23 is applied to the light receiving device 25, which then outputs a pulse signal. The pulse signal is applied through a detector and an amplifier to the speed control circuit, so that the latter outputs an instruction signal which is applied to the drive motor control circuit to accelerate the drive motor 20. Thus, the drive motor 20 is turned at high speed to turn the drive ring 3 quickly. When the zoom lens system approaches the position corresponding to the desired image magnification of the present picture size by the rotation of the drive ring 3, first the speed control slit 27 aligns with the slit 24a of the stationary slit plate 24 and a pulse signal is applied to the detector. Therefore, through a signal path similar to that in the case of acceleration, the drive motor is decelerated to the initial drive speed. Next, the positioning slit 26 aligns with the slit 24a of the stationary slit plate 24, and the pulse signal due to the alignment of the slit 26 with the slit 24a is applied to the detector. Therefore, through the same signal path as that in the case of acceleration, the drive motor 20 is braked and the positioning is accomplished. The correlation between the speed and time in this case is as indicated in FIG. 5. The integration of speed function with respect to time (the hatched area in FIG. 5) corresponds to the amount of position change. The initial drive speed is determined from the brake torque of the drive motor, the inertia of the entire drive system and the positioning allowance range. In a drive system in which the above-described speed control is not carried out, the drive is effected at the initial drive speed as shown in FIG. 6. Although this may simplify the control system, it takes a relatively long time to achieve the position change.

Figure 4:
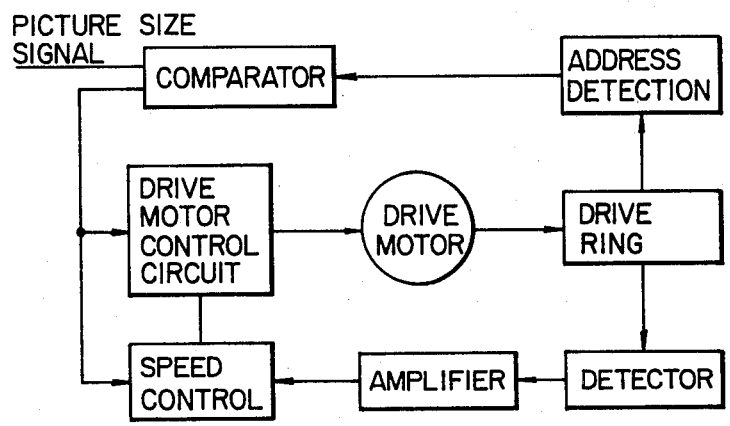
FIG. 4 is a block diagram showing a control system.

The functions of the various circuits in FIG. 4 are extremely simple, and no detailed schematic diagrams of the like are believed to be necessary for a full understanding of the invention. For example, the address detection circuit merely generates a picture size signal corresponding to which one or more of the address detection devices is outputting a signal, and the comparator merely provides a high, low or middle output depending on whether the present picture size setting is greater than, less than or equal to the desired picture size setting. The input to the drive motor control circuit merely disables the circuit if the picture signals are equal, and determines the direction of motor drive if they are unequal. When unequal, the speed at which the motor is driven is determined by the input from the speed control circuit. This could be easily accomplished in digital form by appropriate decoders and an analog-to-digital (A/D) converter for providing an analog drive signal to the motor. Alternatively, the drive motor control circuit could include a variable gain amplifier having its gain controlled by the speed control circuit output and its polarity controlled by the input from the comparator.

The speed control circuit in this embodiment need only provide one of two outputs and could have any of a variety of suitable configurations. For example, it could be a counter which is reset at a count of three and counts pulses from the amplifier. Assuming a count of zero at the ring position shown in FIG. 2, the signal from the comparator would enable the counter output and a low level speed signal would be supplied to the drive motor control circuit. At a count of 1, the speed signal would increase, it would decrease at a count of 2 and the counter would be reset at a count of 3 when the next positioning slit 26 is detected, after which the cycle would repeat if necessary. This is but one example and should in no way be considered limiting.

Figure 7:
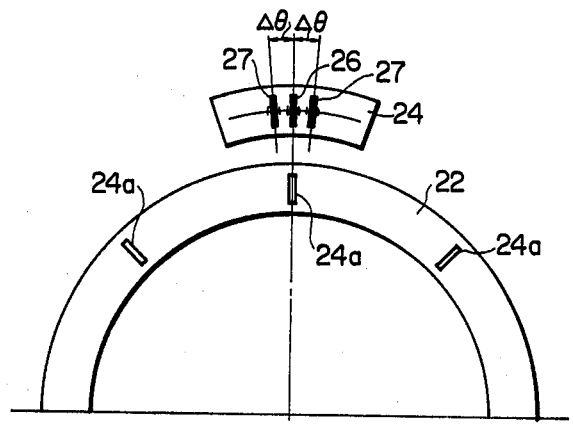
FIGS. 7 and 8 are plan views showing modifications of the aforementioned position detecting rotary slit board and stationary slit plate.

It is not always necessary to provide the speed control slits 27 on the rotating slit board 22; that is, the speed control slits 27 and positioning slit 26 may be provided on the stationary slit plate as shown in FIG. 7. In this case, it is necessary that the slit 24a provided in the stationary slit plate 24 in the above-described embodiment be formed in the position detecting rotary slit board 22. Furthermore, it is necessary that additional light receiving devices 25 be provided for speed slits 27, and that either a light emitting device 23 is rotated in synchronization with the positioning slit 24a or light emitting devices 23 are provided for each of the light receiving devices 25 in such a manner that the former confront the latter.

Figure 8:
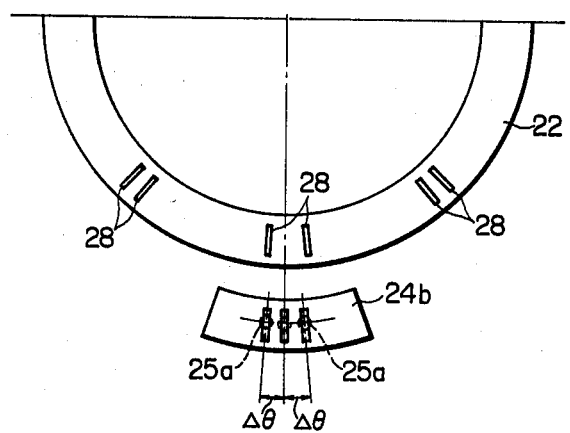
Figure 9:
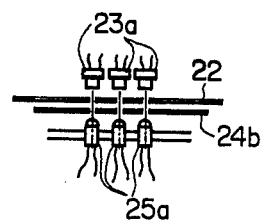
FIG. 9 is a sectional view showing the essential components in FIG. 8.

Furthermore, the image magnification control mechanism described above may be modified so that, as shown in FIGS. 8 and 9, the address detecting light emitting devices and light receiving devices 23a and 25a arranged at the positions corresponding to the desired picture sizes are collected at one place, and slits are formed at the positions corresponding to the different picture sizes to provide binary signals representative of the picture sizes, i.e. to provide address specifying signals in the form of binary signals by allowing specific combinations of one or more of the address detecting devices to be energized at any give magnification position. With the address specifying signals in the form of binary signals, a scan mode and a jump mode can be switched, e.g. by disabling the deceleration until the address immediately prior to the desired address is detected. Thus, even in the case where it is necessary to change the picture size by two or three steps, the picture size can be changed through the jump mode operation in a short time.

This invention has been described with respect to its preferred embodiments; however, the invention is not limited thereto or thereby. For instance, the image magnification control mechanism can be provided by using a magnetic belt and a magnetic head in combination instead of optical means such as the slits, light emitting devices and light receiving devices described above. Furthermore, in the above-described method utilizing light, infrared rays may be employed instead of visible rays. In addition, reflecting members can be mounted on the drive ring so as to obtain a detection signal from light reflected from the reflecting member instead of light passing through the slits.

As is apparent from the above description, according to this invention, the speed control not only reduces the positioning speed, but also eliminates the pulse memory circuit and the zero reset mechanism and circuit for zero setting which are required in the use of a pulse motor. Since it is substantially unnecessary to quickly accelerate or brake the drive motor, a relatively low cost motor can be employed. Since the detecting and controlling members are mounted on the same drive ring, the components forming the drive transmission system may be machined with relatively low machining accuracy while still achieving a high accuracy positioning operation. Thus, according to the invention, a novel image magnification adjustment system with high accuracy can be provided for a facsimile zoom lens at a low manufacturing cost.

What is claimed is:

1. In a variable magnification image recording device of the type wherein the image magnification is varied by moving a drive member to vary the position of at least a portion of a zoom lens, an image magnification control mechanism comprising:
    detecting means for detecting when said drive member is positioned at any one of only a finite number of discrete positions corresponding to different image magnifications; and
    drive control means for moving said drive member between said finite number of positions.

2. An image magnification control mechanism as claimed in claim 1, wherein said detecting means also detects the particular one of said finite number of positions at which said drive member is positioned.

3. An image magnification control mechanism as claimed in claim 1, wherein said detecting means comprises:
    movable means movable in synchronization with said drive member and having only a finite number of first indications thereon corresponding respectively to each of said finite number of image magnifications; and
    a positioning detector for detecting the positioning of one of said first indications at a first predetermined fixed position.

4. An image magnification control mechanism as claimed in claim 3, wherein said detecting means further comprises magnification detecting means for detecting which of said first indications is at said predetermined fixed position.

5. An image magnification control mechanism as claimed in claim 4, wherein said magnification detecting means comprises:
    only a finite number of second indications on said movable member each corresponding to a respective one of said first indications; and
    means for detecting the positioning of one of said second indications at a second predetermined fixed position corresponding to the positioning of said respective first indication at said first fixed position.

6. An image magnification control mechanism as claimed in claim 4, wherein said magnification detecting means comprises:
    a second indication on said movable member; and
    only a finite number of detecting means for detecting the positioning of said second indication at only a finite number of different positions each corresponding to the positioning of a respective one of said first indications at said first predetermined fixed position.

7. An image magnification control mechanism as claimed in claim 3, wherein said first indications are apertures in said movable member and wherein said positioning detector comprises a stationary member having an aperture therein, a light source, and a light detector for detecting light passing through said stationary member aperture and one of said first indication apertures.

8. An image magnification control mechanism as claimed in claim 1, further comprising speed control means for maintaining a first speed of drive member movement within a predetermined range of one of said finite number of positions and at least a second speed of drive member movement outside of said predetermined range.

9. An image magnification control mechanism as claimed in claim 3, further comprising speed control means for maintaining a first speed of drive member movement within a predetermined range of one of said finite number of positions and at least a second speed of drive member movement outside of said predetermined range.

10. An image magnification control mechanism as claimed in claim 9, wherein said drive control means moves said movable member at a speed determined by a speed control signal and wherein said speed control means includes:
    only a finite number of speed indications carried on said movable member adjacent said first indications; and
    a speed control circuit for providing said speed control signal to said drive control means in accordance with the detection of said speed indications at said predetermined fixed position.

11. An image magnification control mechanism as claimed in claim 9, wherein said drive control means moves said movable member at a speed determined by a speed control signal and wherein said speed control means includes at least first and second speed control detectors on either side of said positioning detector for detecting said first indications at speed control positions other than said first fixed position and means for providing a speed control signal which varies in accordance with signals from said speed control detectors.

* * * * *